(12) United States Patent
Vollhardt et al.

(10) Patent No.: US 8,950,392 B2
(45) Date of Patent: Feb. 10, 2015

(54) SYSTEMS AND METHODS FOR SOLAR ENERGY STORAGE, TRANSPORTATION, AND CONVERSION UTILIZING PHOTOCHEMICALLY ACTIVE ORGANOMETALLIC ISOMERIC COMPOUNDS AND SOLID-STATE CATALYSTS

(75) Inventors: K. Peter C. Vollhardt, Oakland, CA (US); Rachel A. Segalman, Pleasanton, CA (US); Arunava Majumdar, Orinda, CA (US); Steven Meier, Edmond, OK (US)

(73) Assignee: The Regents of the University of California, Oakland, CA (US)

( * ) Notice: Subject to any disclaimer, the term of this patent is extended or adjusted under 35 U.S.C. 154(b) by 1023 days.

(21) Appl. No.: 13/002,645

(22) PCT Filed: Jul. 13, 2009

(86) PCT No.: PCT/US2009/050418
§ 371 (c)(1),
(2), (4) Date: Apr. 28, 2011

(87) PCT Pub. No.: WO2010/009052
PCT Pub. Date: Jan. 21, 2010

(65) Prior Publication Data
US 2011/0277747 A1    Nov. 17, 2011

Related U.S. Application Data

(60) Provisional application No. 61/080,522, filed on Jul. 14, 2008.

(51) Int. Cl.
*F24J 2/34* (2006.01)
*F24J 2/30* (2006.01)
(Continued)

(52) U.S. Cl.
CPC ............. *H01L 31/0586* (2013.01); *C09K 5/16* (2013.01); *H01M 14/005* (2013.01); *H01G 9/20* (2013.01); *Y02E 10/50* (2013.01); *Y10S 204/90* (2013.01)

USPC .......... 126/619; 126/400; 126/271.1; 60/645; 60/649; 60/650; 204/900; 502/5; 502/20; 502/102; 502/415; 502/416

(58) Field of Classification Search
USPC ....................................................... 126/618
See application file for complete search history.

(56) References Cited

U.S. PATENT DOCUMENTS 4,004,571 A *  1/1977  Schwerzel et al. ............ 126/714
4,004,572 A *  1/1977  Nathan et al. ................ 126/714
(Continued)

OTHER PUBLICATIONS

Chen at al. "Photosubstitution of (Fulvalene)tetracarbonyl-ediruthenium by Alkenes and Alkynes: First Observation of Alkyne Coupling on Fulvalene Dimetals and Synthesis of a (Fulvalene)dimetallacyclopentadiene(alkene) Complex" Organometallics 2002, 21, 749-760.*

(Continued)

*Primary Examiner* — Steven B McAllister
*Assistant Examiner* — Martha Becton
(74) *Attorney, Agent, or Firm* — Weaver Austin Villeneuve & Sampson LLP

(57) ABSTRACT

A system for converting solar energy to chemical energy, and, subsequently, to thermal energy includes a light-harvesting station, a storage station, and a thermal energy release station. The system may include additional stations for converting the released thermal energy to other energy forms, e.g., to electrical energy and mechanical work. At the light-harvesting station, a photochemically active first organometallic compound, e.g., a fulvalenyl diruthenium complex, is exposed to light and is photochemically converted to a second, higher-energy organometallic compound, which is then transported to a storage station. At the storage station, the high-energy organometallic compound is stored for a desired time and/or is transported to a desired location for thermal energy release. At the thermal energy release station, the high-energy organometallic compound is catalytically converted back to the photochemically active organometallic compound by an exothermic process, while the released thermal energy is captured for subsequent use.

21 Claims, 4 Drawing Sheets

(51) Int. Cl.
*C09K 5/16* (2006.01)
*F24J 2/04* (2006.01)
*H01L 31/053* (2014.01)
*H01M 14/00* (2006.01)
*H01G 9/20* (2006.01)

(56) References Cited

U.S. PATENT DOCUMENTS

| | | | | |
|---|---|---|---|---|
| 4,004,573 | A | * | 1/1977 | Frieling et al. ............... 126/615 |
| 4,424,805 | A | * | 1/1984 | Neary ........................... 126/714 |
| 4,446,041 | A | * | 5/1984 | Neary ........................... 252/70 |
| 4,545,207 | A | * | 10/1985 | Neary ........................... 60/645 |
| 4,606,326 | A | * | 8/1986 | Giordano et al. ............. 126/400 |
| 4,839,008 | A | * | 6/1989 | Hill .............................. 204/157.15 |
| 5,312,913 | A | * | 5/1994 | Mizutani et al. .............. 540/1 |
| 5,647,343 | A | * | 7/1997 | Sabet ............................ 126/619 |
| 6,309,611 | B1 | * | 10/2001 | Tabatabaie-Raissi et al. ........................... 422/186.3 |
| 2004/0031515 | A1 | * | 2/2004 | Sadatomi et al. ............. 136/239 |

OTHER PUBLICATIONS

Chaston, et al. "Palladium-on-Charcoal Catalsys" Platinum Metals Rev., 1961, 5, (4), 122-125.*

Boese, Roland et al., "Photochemistry of (Fulvalene)tetracarbonyldiruthenium and Its Derivatives: Efficient light energy storage devices", J. Am. Chem. Soc. 1997, 119, 6757-6773.

Vollhardt, K. Peter C. et al., "Synthesis, structure, and photochemistry of tetracarbonyl(fulvalene)diruthenium. Thermally reversible photoisomerization involving carbon—carbon bond activation at a dimetal center", J. Am. Chem. Soc. 1983, 105, 1676-1677.

Zhu, Bolin et al., "Synthesis of 2,2',3,3'-Tetramethyl- and 2,2',3,3'-Tetra-*tert*-butylfulvalene: Attractive platforms for dinuclear transition metal fragments, as exemplified by ($\eta^5$:$\eta^5$-2,2',3,3'-*t*-Bu$_4$C$_{10}$H$_4$)M$_2$(CO)$_n$ (M=Fe, Ru, Os, Mo) and first x-ray crystal structures of fulvalene diiron and diosmium complexes", Synthesis 2005, No. 19, pp. 3373-3379, Oct. 25, 2005.

* cited by examiner

SYSTEMS AND METHODS FOR SOLAR ENERGY STORAGE, TRANSPORTATION, AND CONVERSION UTILIZING PHOTOCHEMICALLY ACTIVE ORGANOMETALLIC ISOMERIC COMPOUNDS AND SOLID-STATE CATALYSTS

CROSS-REFERENCE TO RELATED APPLICATIONS

This application claims benefit of prior U.S. Provisional Application No. 61/080,522 filed Jul. 14, 2008, titled "Systems and methods for solar energy storage, transportation, and conversion" naming Vollhardt et al. as inventors, which is herein incorporated by reference for all purposes.

STATEMENT OF GOVERNMENTAL SUPPORT

This invention was made with government support under Contract No. DE-AC02-05CH11231 awarded by the United States Department of Energy to the University of California. The government has certain rights in this invention.

FIELD OF THE INVENTION

The invention relates to systems and methods for solar energy storage, transportation and conversion. Specifically, the invention relates to conversion of solar energy to chemical bond energy, and, subsequently, to thermal energy, with the use of photochemically active organometallic assemblies.

BACKGROUND OF THE INVENTION

Harnessing the unlimited energetic potential of sunlight is one of the cornerstones of current efforts to arrive at future solutions to global energy problems. These problems are (primarily) twofold, namely the pollution and evolution of greenhouse gases associated with burning fossil fuels (85% of the 13 TW of yearly global energy production is based on combustion), and the fact that such fuels are limited and will become unavailable in the not too distant future.

Photovoltaic power generation and solar thermal power generation are currently the two most widely exploited methods for harnessing solar power. Photovoltaic power generation transforms solar energy directly to electricity without generating heat. In contrast, solar thermal power generation systems rely on concentrating sunlight to generate heat, which can be converted to power using gas or steam turbines via Brayton cycle or Rankine cycle mechanisms, respectively. Concentration of solar energy is accomplished by parabolic troughs or by mirrors that direct sunlight to a collector tower. The concentrated energy can be used, for example, to heat a boiler atop the collector tower and generate steam that is piped into a turbine, where electricity can be produced. Storage of the sun's heat in these systems is accomplished by heating and storing molten salts, such as sodium and potassium nitrates.

Unfortunately, traditional solar thermal power generation has a number of limitations which include the necessity to track and adjust the mirrors throughout the day in order to keep the focused light on the collector tower, and the necessity to use or convert the obtained thermal power on-site. This is because current solar thermal power storage media (e.g., molten salts) are not easily amenable to transportation over long distances due to heat losses, and, generally, have a rather limited duration of heat storage. In addition, high-temperature heat storage which is often used during power generation to increase efficiency, leads to even faster heat loss.

A conceptually different approach would be to store sun light energy in a molecular system. In this system, a lower energy compound is photoconverted to a higher energy isomer, which, in turn, is converted back to the lower energy isomer with release of thermal energy. The best known purely organic examples of such processes are the norbornadiene (1)—quadricyclane (2) and the stilbene (3)—dihydrophenanthrene (4) cycles (reactions 1 and 2 respectively). While much has been learned from such and other prototypes, they all have drawbacks to varying degrees, among them photoinstability, low quantum yields, structural restrictions of the absorbing light frequency range, and limited capacity for energy storage. These limitations have precluded industrial applicability of such systems.

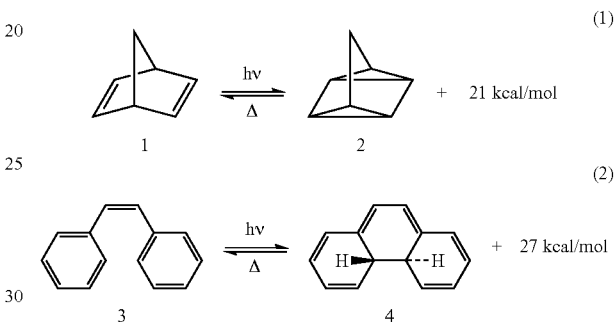

In 1983, a first organometallic compound that was capable of photoconversion to its higher-energy isomer and reverse exothermic isomerization was reported by Vollhardt et al. (J. Am. Chem. Soc. 1983, 105, 1676-1677). In this system, as shown in equation 3, a photochemically active fulvalenyl diruthenium complex 5 is converted to a higher-energy isomer 6 upon exposure to sunlight. The higher-energy isomer 6 can be converted back to the low-energy isomer 5 upon heating of 6. This reverse reaction is accompanied by a significant release of thermal energy. It was determined that conversion of 6 to 5 releases about 30 kcal/mol of energy.

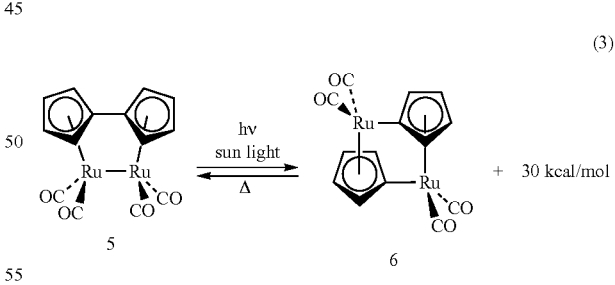

However, to date, organometallic assemblies shown in equation 3 have not been commercialized for solar energy storage.

SUMMARY OF THE INVENTION

Described herein is an integrated solar energy storage and energy conversion system adapted for use with photochemically active organometallic compounds, such as with bisannulenyl dimetal complexes (e.g., with complex 5). The system for converting solar energy to chemical energy, and, subsequently, to thermal energy includes a light-harvesting station, a storage station, and a thermal energy release station. The system may include additional stations for converting released thermal energy to other energy forms, e.g., to electrical energy and mechanical work.

At the light-harvesting station, a photochemically active lower-energy organometallic compound, e.g., a fulvalenyl diruthenium complex, is exposed to light and is photochemically converted to a second, higher-energy organometallic compound, which stores light energy in the form of chemical energy. The light harvesting station, in one embodiment, includes a container adapted for housing the photochemically active compound (in solid or in solution) during its photochemical conversion to the higher-energy isomer. The container is adapted for exposing the photochemically active compound to sunlight. The container in various embodiments may be adapted for running the photochemical conversion in a continuous or in a batch mode. In some embodiments, the container includes a tube or a bed adapted for continuously running a solution of photochemically active compound while exposing it to sunlight. For example tubes made of transparent materials or open surfaces (e.g., semi-open tubes), adapted for continuous running of solution, may be used. In some embodiments, the tubes or beds are adapted for maximizing the surface area of solution that is exposed to sunlight.

At the storage station, the higher-energy organometallic compound is stored for a desired time and/or is transported to a desired location. The storage station includes a storage container adapted for storing the higher-energy isomer in solid or in solution for a desired period e.g., for at least 12 hours, at least 1 month, or at least 1 year. In some embodiments the storage container is adapted to be transportable, such that the higher-energy compound may be transported in solid-state or in solution to a desired location. Advantageously, the higher-energy isomer is stable under storage conditions, and does not spontaneously decompose to lower-energy compounds. The storage temperature may range from between about −10° C. to 30° C., preferably from between about 15° C. to about 25° C., and may be modified depending on the properties of a particular compound in use. The ability to transport and store solar energy in the form of chemical bond energy makes this system particularly advantageous in comparison to photovoltaics and solar thermal power generators. In some embodiments, the storage container itself remains stationary, while the stored compound is transported through the container. For example, in some embodiments the storage container includes one or more pipelines through which a solution of lower-energy organometallic compound travels to a desired location. The transportation through the pipelines can be assisted with appropriate pumping systems. In one implementation, photoconversion, storage and transportation are performed in a continuous process.

Upon storage, the high-energy organometallic compound arrives at the thermal energy release station where it is converted back to the initial photochemically active organometallic compound in an exothermic process, while the released energy is captured for subsequent use. The entire process may be repeated as many times as needed. The conversion to lower energy isomer may be accomplished by contacting the lower energy isomer with a solid catalyst or reactant (e.g., charcoal, solid or solid-supported Lewis acid or base, or an oxidizing agent). In other embodiments, the conversion to lower energy isomer is accomplished by contacting the higher energy isomer with a liquid comprising a catalyst or a reactant. For example conversion to lower energy isomer may be accomplished by contacting the higher energy isomer with a reagent or a catalyst selected from the group consisting of water, a solution of a Lewis acid (e.g., $Cu(OTf)_2$) or base (e.g., imidazole), and, in some cases, a solution of an oxidizing agent (e.g., a ferricinium salt).

In some embodiments the higher-energy isomer is converted to a lower energy isomer in more than one step. For example, the higher energy isomer may first be reacted with a source of a ligand (e.g., an iodide or iodine) to form a ligand-substituted compound (e.g., an iodo-substituted compound). The ligand-substituted compound can be then converted to the lower energy isomer. Release of energy can occur during any of these steps.

The described system is environmentally friendly and is sustainable, and typically involves interconverting organometallic compounds for many cycles, e.g., for more than 10 cycles, and even for more than 50, 100, 1,000 and 10,000 cycles. Advantageously, the organometallic compounds can be interconverted without degradation. The single conversion of higher-energy isomer to the lower-energy isomer releases at least about 15 kcal/mol of thermal energy, preferably at least about 30 kcal/mol of thermal energy, and up to 40 kcal/mol of thermal energy or more depending on the properties of a particular compound in use. The released thermal energy can be used directly for heating, can be converted directly to electricity, or can be converted to mechanical work and subsequently to electricity at a thermal energy conversion station.

In some embodiments, the heat released at the thermal energy release station is transferred to a working fluid in a heat exchanger. In one embodiment, the hot working fluid (e.g., water or alcohol in liquid phase or gas phase) may be used for heating, e.g., for heating a building. In other embodiments the working fluid (e.g., steam or hot gas) is used to generate work in any type of a thermal engine, including, for example, a Rankine cycle (e.g., steam turbine), a Brayton cycle (e.g., gas turbine) or a Sterling cycle (e.g., reciprocating external combustion engine). Mechanical work can be used to generate electrical power, e.g., by running a generator to produce electrical power.

Yet in other embodiments, the heat generated at the thermal energy release station is converted directly to electricity using thermoelectric materials. In this embodiment, the heat exchange fluid is not required, and the outer portion of the thermal energy release station may be used as a heat source for hot junctions with a thermoelectric material (e.g., a semiconductor). Electricity is generated in electrical circuits comprising a hot junction and a cold junction to a thermoelectric material in accordance with thermoelectric effects.

In a separate aspect of the invention, a catalytic process for converting a higher-energy organometallic isomer to a lower-energy isomer in a solar energy storage system is provided. It was unexpectedly discovered that a higher-energy isomer 6 can be converted to a lower-energy isomer 5 when exposed to a catalyst without heating. In some embodiments, this catalytic process is integrated into the solar energy storage and conversion system, such that the thermal energy release station includes a catalyst for converting the higher-energy compound to the lower-energy isomer. Suitable catalysts include charcoal, alumina, solids comprising coordinating groups, Lewis acids or bases, and water. The catalytic process can be performed with solid or liquid catalysts.

The catalytic process is particularly advantageous because it allows efficient regeneration of low-energy isomer and release of thermal energy without the need to heat the higher-energy isomer. Understandably, in the original process, which is shown in equation 3, the necessity to expend energy for heating compound 6 to some extent undermines the purpose of energy storage. However, thermal conversion of the higher-energy complex to the lower-energy isomer is within the scope of some embodiments of the solar energy storage and conversion system provided herein, particularly where the heat released by the thermal conversion greatly exceeds that required to induce it. In some embodiments, regenerative heat exchangers are used to divert a fraction of released heat and to induce the thermal conversion of higher-energy compound to a lower-energy compound.

According to one aspect, a catalytic thermal energy release station is provided. In one embodiment, the thermal energy release station comprises an entry port adapted for receiving a high-energy organometallic compound (e.g., in solution); a solid-state catalyst capable of catalyzing or configured to catalyze conversion of the high-energy organometallic compound to a lower-energy photochemically active organometallic compound; and an exit port adapted for removing the photochemically active organometallic compound obtained after catalytic conversion. The catalyst may reside on the walls of a catalytic conversion chamber, which is partially or completely filled with a solution of high-energy organometallic compound. Alternatively, the solution of a high-energy organometallic compound may be passed over a bed of catalyst. Advantageously, solid-phase catalyst and the solution of organometallic compound can be easily separated once the catalytic conversion is completed. In some embodiments, separation is accomplished by filtering the solution of the organometallic compound upon reaction completion to remove any catalyst particles. In other embodiments, the catalyst firmly resides on the solid support, such as the chamber walls, such that no loose particles are mixed with the solution of organometallic compound. In this case, filtration may be unnecessary. In some embodiments, it is preferable to use a packed and/or fixed catalyst bed in the thermal energy release station. In this implementation the solid catalyst is packed within the catalytic conversion chamber or is fixed on support within the chamber, such that it cannot be displaced by a flow of liquid. In some embodiments, a solution of higher-energy compound is flowed continuously through the catalytic conversion chamber without removing packed or fixed catalyst. Advantageously, catalyst is not depleted in such system, and filtration of the solution of organometallic compound is unnecessary.

The thermal energy release station in some embodiments includes a heat exchange fluid (e.g., gas, water, alcohol, organic liquids or mixtures thereof) circulating in a separate chamber adjacent to the catalytic conversion chamber. The working fluid is heated up or is pressurized by the heat released in the catalytic conversion chamber and is subsequently used for heating, producing mechanical work and/or generating electrical power. As mentioned previously, in some embodiments electrical power is generated directly from heat using thermoelectric materials.

In some embodiments, the entire system including a light-harvesting station, a storage station, and a thermal-energy release station is configured for operation in a continuous regime. In this regime, solution of an organometallic compound is allowed to flow continuously through the stations and between the stations, e.g., through the pipelines. For example, in one embodiment, a storage and transportation pipeline connects the light-harvesting station with the thermal energy release station. This pipeline is configured for providing the higher-energy compound from the light-harvesting station to the thermal energy release station. In some embodiments, a long-term storage station may be connected to this pipeline to enable long-term storage of the higher-energy compound. A reverse pipeline (e.g., a separate pipeline) connecting the thermal energy release station with the light-harvesting station is adapted for transporting the lower-energy compound obtained upon catalytic conversion back to the light-harvesting station to complete the cycle. The system may be adapted to operate entirely in a continuous mode, or, in other implementation only one or two of the stations is configured for operation in a continuous mode, while the rest of system may operate in a batch mode.

In another aspect, a composition of matter is provided. The composition includes at least one of a photochemically active organometallic compound and a higher-energy organometallic compound, wherein the photochemically active organometallic compound is capable of being or configured to be converted to the higher-energy organometallic compound upon exposure to light, and the higher-energy organometallic compound is capable of being or configured to be converted to the photochemically active organometallic compound upon exposure to a catalyst; and (b) a catalyst suitable for converting the higher-energy organometallic compound to the photochemically active organometallic compound.

In yet another aspect, a method for converting light energy to other forms of energy is described. The method includes: (a) providing a high-energy organometallic compound obtained upon a photochemical isomerization of a photochemically active lower energy organometallic compound; and (b) contacting the high-energy organometallic compound with a solid-state catalyst or a liquid catalyst (or catalyst in solution) to convert the high-energy organometallic compound to the lower-energy organometallic compound and to release at least about 15 kcal/mol of thermal energy. The method can also include exposing the photochemically active lower-energy organometallic compound to light to convert the compound to its high-energy isomer and repeating the entire process e.g., at least 2 times, or at least 50, 100, 1,000, or 10,000 times. In some embodiments the process involves transferring the released thermal energy to a working fluid. In other embodiments the process involves directly converting the released thermal energy to electrical power with the use of a thermoelectric material. In some embodiments, at least some operations of the process are performed continuously. For example, a continuous stream of solution may be exposed to sunlight at a light-harvesting station and/or a continuous flow of solution is directed to the thermal energy release station in a pipeline of a storage and transportation station, and/or a continuous flow of solution is delivered and is passed through a thermal energy release station, and/or a continuous flow of solution is directed from the thermal energy release station back to the light harvesting station. In some implementations, the entire process is performed continuously. In other implementations only one or two stations operate in a continuous regime.

These and other features and advantages of the present invention will be described in more detail below with reference to the associated drawings.

DETAILED DESCRIPTION OF PREFERRED EMBODIMENTS

Figure 1:
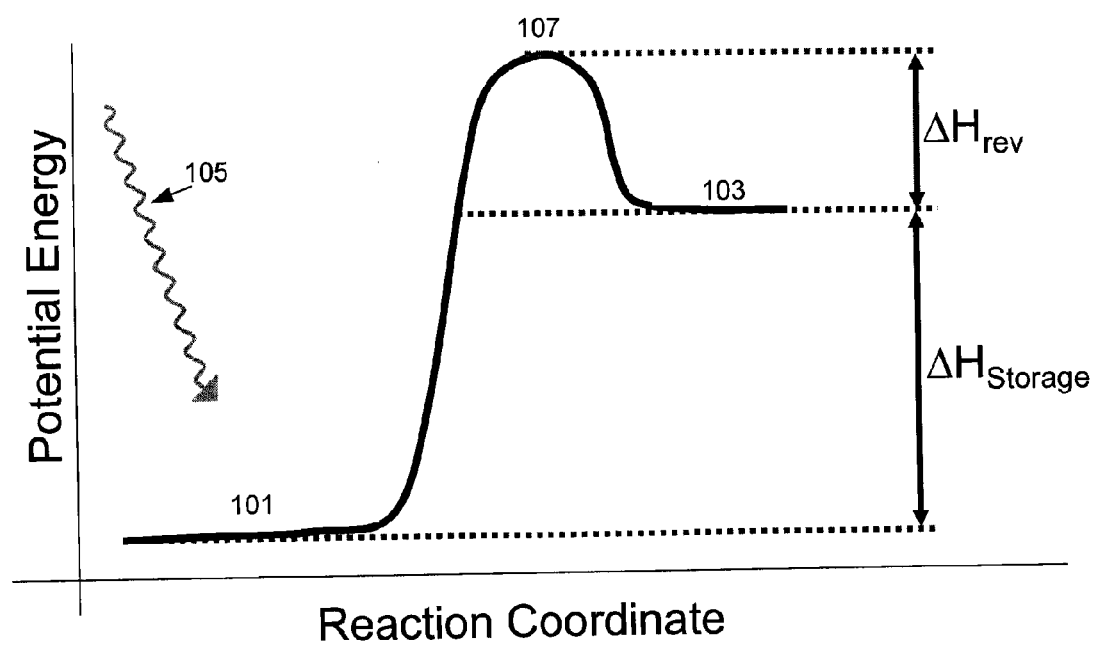
FIG. 1 is an energy diagram illustrating interconversions of lower-energy and higher-energy organometallic compounds, suitable for use in the solar energy storage and conversion system described herein.

A system for solar energy storage, transportation and conversion is described. The system is based on photochemical conversion of a first organometallic compound (e.g., a fulvalenyl dimetal complex) to a higher-energy isomer, and on a subsequent thermal or catalytic transformation of the higher-energy isomer back to the first lower-energy organometallic compound, where the latter transformation is accompanied by release of heat. In some embodiments non-catalytic transformations, which may require stoichiometric amounts of reagents for conversion of higher-energy isomer to a lower energy compound and subsequently to the low-energy isomer are employed. The system may be used for converting solar energy to various other types of energy, such as thermal energy, mechanical work, and electrical energy. Advantageously, the system allows storing solar energy in the form of chemical bond energy for prolonged periods of time, such as for one or more days, months, and even years. Advantageously, the system allows transporting energy in the form of high-energy organometallic compound, to a desired location where the energy is controllably released as heat, which, if needed, is further converted to mechanical work and/or electricity. Prolonged storage and transportation capabilities of the described system compare favorably with the capabilities of current solar thermal power plants, where only limited storage and transportation of energy is achieved due to rapid heat loss of heat storage media, such as molten salts.

In addition, the described system is environmentally benign and is sustainable because it is based on reversible interconversions of organometallic isomers, which can be repeatedly interconverted for many cycles, such as for more than 5, 10, 50, 100 or even for more than 1,000 and 10,000 cycles without substantial decomposition (e.g., with less than about 1% decomposition of compounds over 50 cycles). Thus, for example, the system depicted in equation 3 can be interconverted for more than 50 cycles, where each cycle refers to one full "5 to 6 to 5" interconversion.

The system will be described primarily as a system for solar energy storage, since it is a particularly important application. However, the system may be used to store and transform essentially any form of light energy, including light energy from lamps and other artificial light sources. Further, while the system is particularly advantageous for its ability to store light energy, in some embodiments the system may be used entirely as an energy conversion system where light energy captured by an organometallic complex is immediately converted to heat, mechanical work, electricity, or combinations thereof, without any appreciable period of storage.

Finally, while the system will be described using example compounds 5 and 6 for illustration purposes, the system is not limited to these particular compounds. A number of other bisannulenyl dimetal complexes, such as fulvalenyl dimetal complexes may be suitable for the described light energy storage and conversion system. These compounds will be described in a separate section.

FIG. 1 shows an energy diagram for a system of two interconverting organometallic isomers that can be used for solar energy storage and conversion. A first organometallic compound, such as fulvalenyl di-Ru complex 5, has a relatively low potential energy 101 and is photochemically active. That is, upon exposure to sunlight 105, the lower-energy organometallic compound isomerizes to a higher-energy isomer, such as di-Ru complex 6, which is characterized by potential energy 103. The difference between the energy levels 103 and 101 amounts to $\Delta H_{storage}$, which is essentially the energy of sunlight stored in the form of chemical bond energy of the high-energy isomer. This energy can be released as heat, when the higher-energy isomer converts back to the lower-energy photochemically active isomer. The release can occur only if the higher-energy compound can overcome the activation barrier 107. The energy difference between 107 and 103 is $\Delta H^{\neq}_{Rev}$, which is the activation barrier of the reverse reaction.

In the absence of a catalytic pathway, the higher-energy isomer can be converted to a lower energy isomer if it is heated to overcome barrier 107. However, in the presence of a catalyst, the barrier 107 can be lowered sufficiently that the reverse reaction can occur at ambient temperatures. Unexpectedly and gratifyingly, a catalytic pathway for such conversion has been found which allows conversion of higher-energy isomer to the lower-energy isomer at room temperature. Suitable catalysts include without limitation charcoal, metal salts, particularly electrophilic salts, such as $AgNO_3$, $HgCl$, $Cu(OTf)_2$, Lewis acids (e.g., $ZnBr_2$, $ZnCl_2$, $BBr_3$) Lewis bases (e.g., imidazole, $PPh_3$, $AsPh_3$, and $P(OPh)_3$), and water.

Referring again to energy framework shown in FIG. 1, the following considerations are recognized for the energy storage system. First, $\Delta H_{storage}$ should preferably be relatively large, such that a useful amount of energy could be stored and converted by the system. Preferably, conversion of a higher-energy isomer to the lower energy isomer releases at least about 15 kcal/mol, more preferably at least about 30 kcal/mol, and even more preferably at least about 40 kcal/mol of thermal energy. As it is shown in equation 3, the fulvalenyl diruthenium system is capable of capturing, storing and releasing about 30 kcal/mol.

The second consideration relates to thermal stability of the lower-energy and higher-energy isomers. Both isomers should be thermally stable in a temperature range under which the system is operated. Thus, the lower-energy isomer should not spontaneously react or decompose, and should be cleanly converted to the higher-energy isomer upon irradiation with sunlight. Similarly, the higher-energy isomer should not spontaneously convert to lower energy compounds during storage and should only be controllably converted to the lower-energy isomer upon exposure to a catalyst or upon heating to a required threshold temperature. Accordingly, the energy barrier 107 should be sufficiently high to prevent spontaneous conversion of higher-energy isomer back to lower-energy isomer during storage. Preferably, $\Delta H^{\neq}_{Rev} \gg k_b T$, wherein $k_b$ is a Boltzmann constant and T is the temperature at which the high-energy organometallic compound is generated and stored, e.g., between about 0° C. to about 30° C. or at room temperature.

Preferably, both the lower-energy and the higher-energy isomers are stable to a temperature of at least about 5° C., more preferably to a temperature of at least about 25°, and even more preferably to a temperature of at least about 40° C. In some embodiments, irradiation of the lower-energy isomer and storage of the higher-energy isomer are performed at temperatures in the range of about −40-40° C., e.g., at temperatures in the range of about 10-30° C. Subsequent conversion of the higher-energy isomer to the lower-energy isomer is performed by exposing the higher-energy isomer to a catalyst, and/or by heating the higher-energy isomer to a required threshold temperature. It is noted that in some embodiments, sunlight irradiation and/or storage may be performed at low temperature (e.g., at a temperature of less than about 0° C.), while transformation of the higher-energy compound may be triggered by exposing it to room temperature or a temperature in a range of between about 10-30° C. A particular choice of temperature ranges will depend on an energy framework for a particular organometallic system, depending on the choice of particular metals, ligands, and ligand substituents.

Additionally, it is important that the energy barrier 107 is sufficiently low that the conversion of the higher-energy isomer to the low-energy isomer could occur below the decomposition temperature of the higher-energy isomer. Thus, preferably conversion of higher-energy isomer does not require heating the high-energy compound to a temperature of greater than about 100° C., or, in some embodiments, does not require heating to a temperature of greater than about 60° C. (with or without the use of catalyst).

Figure 2:
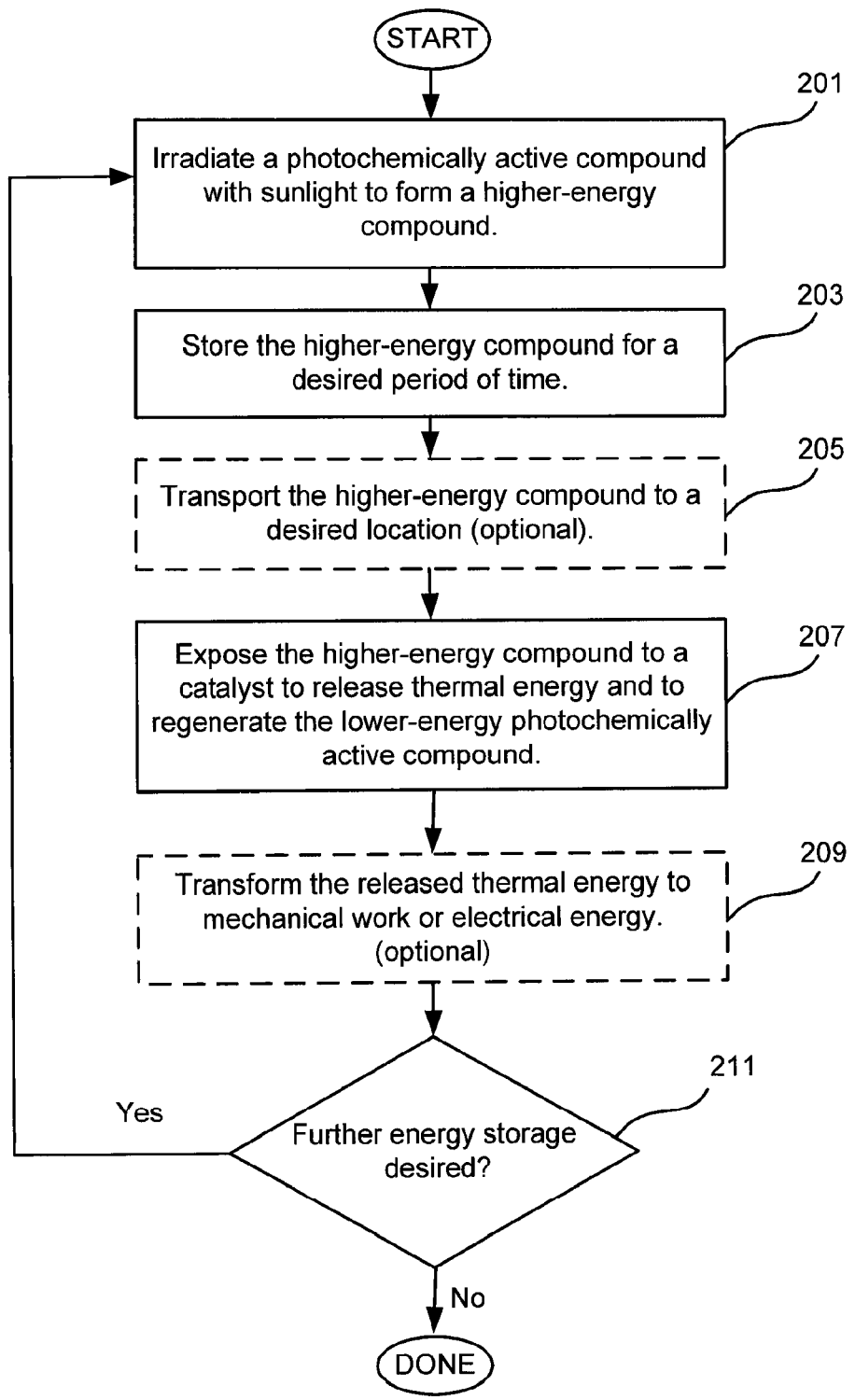
FIG. 2 is a process flow diagram for storing and converting solar energy with the use of organometallic compounds, in accordance with some of the embodiments described herein.

A method for capturing, storing, and transforming light energy to other types of energy using organometallic assemblies is illustrated in a process flow diagram shown in FIG. 2.

The process starts in 201 by providing a photochemically active organometallic compound (e.g., a bisannulenyl dimetal complex) and irradiating it with sunlight to form a higher-energy compound. The photoconversion is performed at a light harvesting station of a solar energy storage and conversion system. The station typically includes a container which is adapted for exposing the photochemically active organometallic compound to sunlight in solution or in solid state. The container in various embodiments may be adapted for running the photochemical conversion in a continuous or in a batch mode.

In some embodiments, the container includes a tube or a bed adapted for continuously running a solution of photochemically active compound while exposing it to sunlight. For example tubes made of transparent materials or open support surfaces (e.g., semi-open tubes or beds), adapted for continuous running of solution, may be used. In some embodiments, the tubes or beds are adapted for maximizing the surface area of solution that is exposed to sunlight. The term "container" as used herein includes both open and closed containers, as well as support surfaces, on which the photochemically active compound resides (either in stationary or mobile form).

In one embodiment, the photochemically active compound is dissolved in a solvent, such as a hydrocarbon solvent (e.g., pentane, hexane, petroleum ether, benzene, toluene, etc.), or a moderately polar solvent (e.g., acetone or chlorinated solvent, such as methylene chloride) and the resulting solution is exposed to sunlight either in stationary form or while flowing the solution. In some embodiments, it is preferable to avoid using coordinating solvents, such as acetonitrile ($CH_3CN$), since these catalyze the thermal reversal to the lower-energy isomer. The photoconversion is accomplished in some embodiments by placing the solution in a container and exposing it to sunlight. In some embodiments, the solution is exposed directly to broad-band sunlight radiation, without using light filters. In other embodiments, a particular range of wavelengths may be obviated by a filter, such as a Pyrex glass wall of a container (for filtering off near UV radiation) or a color filter. Further, in some embodiments, the light-harvesting station may include an apparatus for concentrating sunlight (e.g., one or more adjustable mirrors or parabolic troughs). It is noted that light-concentrating apparatus is optional, since in many embodiments the reaction has a relatively large quantum yield of greater than about 0.05, e.g., greater than about 0.1 (with reference to light of photochemically productive wavelengths). For example, a fulvalenyl di-Ru complex 5 is converted to its higher-energy isomer with a quantum yield of about 0.15 with reference to light in the 325-375 nm wavelength range. The absorption maximum for this compound is centered at $\lambda_{max}$ of 350 nm.

The progress of photoconversion reaction can be monitored by observing the change of color of the irradiated solution (either visually or using spectrophotometric techniques). For example, for ruthenium fulvalenyl complexes, a yellow solution of an original low-energy isomer is transformed into a colorless solution when photoconversion to a higher-energy isomer is completed.

After photoconversion is completed, in the next operation 203, the higher-energy compound is stored for a desired period of time. The higher-energy compound can be stored either in solution or in solid phase. In some embodiments, when only short periods of storage are required (e.g., less than one month, or less than one week), the higher-energy compound may be stored in the original solution which was used for the photoconversion. In other embodiments, when longer periods of storage are needed (e.g., more than one month or more than one year), the higher-energy compound is converted to solid-state form for storage, e.g., by solvent evaporation or crystallization. In general, the higher energy compound may be stored in solid state or in solution for periods longer than one day, one week, one month, and even one year. The storage occurs at a storage station, which is spatially separated from the light-harvesting station, in some embodiments. In other embodiments, light-harvesting station and storage station are spatially identical, that is, the high-energy isomer is stored in the same container and at the same location where it was first photogenerated.

Referring to operation 205, the higher-energy compound may be optionally transported to a desired location, if needed. Thus, for example, the higher-energy compound may be stored in a transportable container in either solid state or in solution. Because organometallic high-energy compounds described herein have high stability and long shelf-lives, they can be transported over large distances by virtually any type of transportation systems, such as by air or ground (e.g., in an airplane, truck, or a train). The storage and transportation capabilities provided by this system are unique because solar energy can be stored for months and even years in the form of chemical bond energy without substantial energy loss, whereas direct conversion of solar energy to heat or even electricity has rather limited storage capabilities due to storage-associated energy losses. The storage capabilities of the described system make it attractive for use in polar regions, where the solar energy may be accumulated during polar day, and can be released after being stored for several months during polar night. Of course, the system can be used for more common application, such as accumulation and release of energy during 24 hour day/night cycle, etc.

In some embodiments, the storage container itself remains stationary during transportation, while the stored compound is transported through the container. For example, in some embodiments the storage container includes one or more pipelines through which a solution of lower-energy organometallic compound travels to a desired location. The transportation through the pipelines can be assisted with appropriate pumping systems. In one implementation, photoconversion, storage and transportation are performed in a continuous process.

Next, in operation 207, the high-energy compound is exposed to a catalyst to release thermal energy and to regenerate the lower-energy photochemically active compound. This is accomplished at a thermal energy release station of the system. In some embodiments, the thermal energy release station is adapted for bringing a solution of the higher-energy organometallic compound into contact with a solid-state catalyst. A variety of solid state catalysts may be employed. These include charcoal, solids having coordinating groups, certain metal salts (e.g., copper or silver salts with large anions such as tetraphenylborate or hexafluorophosphate), and solid or solid-supported Lewis acids or Lewis bases. In some embodiments, polymers having coordinating groups, such as polysiloxane may be used. Other examples include without limitation, polymers with —CN, —NH$_2$, —NHR, —NR$_2$, —OH, —OR, —SH, —SR, and —C=NR coordinating groups, wherein R is an alkyl. For example polystyrene, with one or more substituents, as described above, may be used. Further, the polymers may include one or more heterocyclic coordinating moieties, such as pyridyl, imidazolyl, and pyrazolyl groups. In some embodiments, the coordinating groups need not necessarily reside on an organic polymer, but may reside on any surface-modified solid material, such as a glass, a fiber, etc. In some embodiments, solids with surfaces containing thiol or thioether moieties are used.

The solid catalyst is distributed within the thermal energy release station, such that it has a sufficient surface contact with the solution containing the higher-energy compound. In one embodiment, solution of the high-energy compound enters the thermal energy release station through an entry port, and is then run over a bed of catalyst residing within a catalytic conversion chamber. Upon release of heat and upon transformation to a lower-energy isomer, the solution containing lower energy isomer is removed from the thermal energy release station through an exit port.

Advantageously, solid-phase catalyst and the solution of organometallic compound can be easily separated once the catalytic conversion is completed. In some embodiments, separation is accomplished by filtering the solution of the organometallic compound upon reaction completion to remove any catalyst particles. In other embodiments, the catalyst firmly resides on the solid support, such as the chamber walls, such that no loose particles are mixed with the solution of organometallic compound. In this case, filtration may be unnecessary. In contrast, when liquid-phase catalyst is used, typically an additional laborious separation step is required.

In many embodiments the thermal energy release station includes a heat exchanger containing a heat exchange fluid which captures the released heat for subsequent applications. In some implementations, it is advantageous to coat the inner portion of a heat exchanger with a solid-state catalyst, such that solution of the higher-energy compound has an ample surface contact with the catalyst and such that the released thermal energy could be efficiently captured by the heat exchange fluid.

Figure 3:
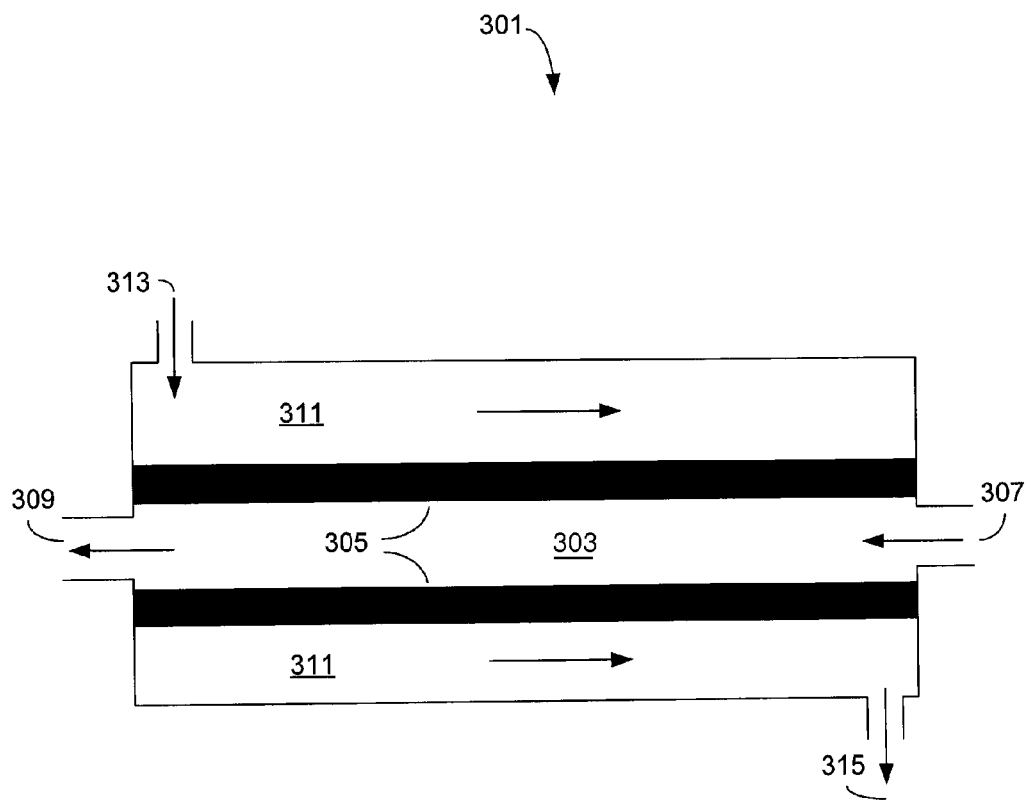
FIG. 3 is a schematic cross-sectional view of a thermal energy release station, in accordance with some of the embodiments described herein.

A schematic cross-sectional view of one illustrative thermal energy release station is shown in FIG. 3. The thermal energy release station 301 includes a generally cylindrically shaped catalytic conversion chamber 303. The walls of the catalytic conversion chamber are coated with a layer of charcoal 305 or with another suitable solid-state catalyst. The catalytic conversion chamber has an entry port 307 for admitting the solution of high-energy compound and an exit port 309 for removing the solution upon completion of the catalytic conversion. The thermal energy release station may operate in a continuous flow mode, in which the solution of organometallic compound is continuously passed through the catalytic conversion chamber 303, and the heat is continuously released. Alternatively, the station may operate in a batch mode, in which a batch of solution of high-energy compound is admitted to the catalytic conversion chamber 303 through an entry port 307, the chamber ports 307 and 309 are then closed, and the solution is allowed to react with the catalyst 305 for a period of time, after which time the exit port 309 opens and the solution is removed. Then, a next batch of high-energy compound is introduced into the chamber for conversion. The thermal energy release station includes a heat exchange chamber 311 generally surrounding the catalytic conversion chamber 313. A heat exchange fluid, which can be a liquid or a gas, enters the heat exchange chamber through an entry port 313 and is flown through the heat exchange chamber to the exit port 315. While in the chamber, the heat exchange fluid is heated and/or is pressurized upon absorbing the heat released in the catalytic exchange chamber, from which it is separated by a wall. The hot and/or pressurized heat exchange fluid is then released and its energy is utilized for heating, generating electricity, and/or mechanical work.

In some embodiments, it is preferable to use a packed and/or fixed catalyst bed in the thermal energy release station. In this implementation the solid catalyst is packed within the catalytic conversion chamber or is fixed on support within the chamber, such that it cannot be displaced by a flow of liquid. In some embodiments, a solution of higher-energy compound is flowed continuously through the catalytic conversion chamber without removing packed or fixed catalyst. Advantageously, catalyst is not depleted in such system, and filtration of the solution of organometallic compound is unnecessary.

The choice of a solvent for the high-energy compound is based on the following considerations. First, both the high-energy compound and the low-energy compound should be soluble in the solvent to avoid unintentional precipitation within the system. Further, it is preferable to use a relatively high-boiling and non-volatile solvent, to avoid evaporation of the solvent upon release of heat. Thus, in some embodiments, it is preferable to use solvents with a boiling point of greater than about 70° C., more preferably of greater than about 80° C., and even more preferably of greater than about 100° C. Suitable solvents include xylene, toluene, benzene, octane, and decane.

The heat exchange fluid, in some embodiments, preferably has high heat transference and high heat capacity. Suitable fluids include water (liquid and/or steam), alcohols (e.g., butanol) and mixtures thereof. Depending on a particular implementation, the heat exchange fluid may be heated in liquid form upon passing through the heat exchange chamber, may be converted from liquid to gas phase, or may enter and exit in gas phase (e.g., steam may be pressurized).

In another embodiment, thermal energy release station is adapted for converting the released thermal energy directly to electrical power with the use of thermoelectric materials. Thermoelectric materials can be used to generate current between spots of different temperature, known as hot spots and cold spots. In one implementation of a thermoelectric process, the catalytic conversion chamber may be thermally isolated on the outside, with the exception of a plurality of exposed hot spots, where hot junctions to a thermoelectric material are made. For example a pair of hot junctions for each electrical circuit may be made, with one hot junction being made to a p-type semiconductor, and the other hot junction being made to an n-type semiconductor. In each circuit, the p-type semiconductor and the n-type semiconductor are connected to a pair of cold junctions (junction to a material with a lower temperature than the temperature at the hot junction), and the circuit is closed by a conductor to allow current flow in accordance with thermoelectric effects. The particular circuit designs for generating thermoelectricity are known to those of skill in the art and will not be described herein. Suitable thermoelectric materials are well-known to those of skill in the art and include without limitation materials based on bismuth telluride, lead telluride, and silicon-germanium alloys.

It is understood that the energy release stations described above, are used as illustrative examples. A number of variations and alternatives may be used in the implementation of heat release stations, and a number of details have been omitted for clarity in the above description. For example, it is understood that the station may include a plurality of heat exchangers, such as the hot solution exiting from the exit port of the catalytic exchange chamber could be cooled in a downstream heat exchanger and the remaining energy be captured. Further, it is understood that a heat transfer fluid may, in turn, transfer energy to another fluid, which may be better suited for subsequent applications. For example, hot water can be used to evaporate a low-boiling fluid, etc. For clarity, "heat exchange fluid" will be also called "working fluid", although in practice different fluids may be used.

Referring again to the process flow diagram of FIG. 2 in 209 the thermal energy released in the thermal energy release station may be optionally transformed to mechanical work and/or electrical energy. It is understood, that in some embodiments, the heat transfer fluid which is also referred to as a working fluid may be used immediately for heating, e.g., for heating a building or for heating food. In other embodiments, the working fluid is used for work extraction in any type of thermal engine. For example, a Rankine cycle or a Sterling cycle may be used to generate work. Further, mechanical work can be used to generate electricity e.g., by running a turbine.

In yet other embodiments, as mentioned above, the thermal energy generated by the catalytic conversion can be directly transformed to electricity with the use of thermoelectric materials. In this embodiment conversion may be performed without a working fluid or with the use of working fluid as a heat transfer medium for the hot junctions.

As described, in operations 201-209 solar energy has been converted to chemical bond energy, was stored in the form of chemical bond energy, and was then transformed to heat, which was optionally transformed to electricity, mechanical work or both. Because catalytic conversion yields the starting photochemically active low-energy isomer, the entire process may be repeated as needed. In operation 211, it is determined by the user of the storage system if further energy storage is required. If needed, the entire sequence of operations 201-211 may be repeated as many times as needed. For example, operations 201-211 may be repeated 10, 10, 100, or even 1,000 and 10,000 times using the same organometallic compounds. When it is finally determined that no additional energy storage is needed, or if it has been determined that organometallic compounds show signs of decomposition, the compounds may be discarded or recycled to recover the metals.

Figure 4:
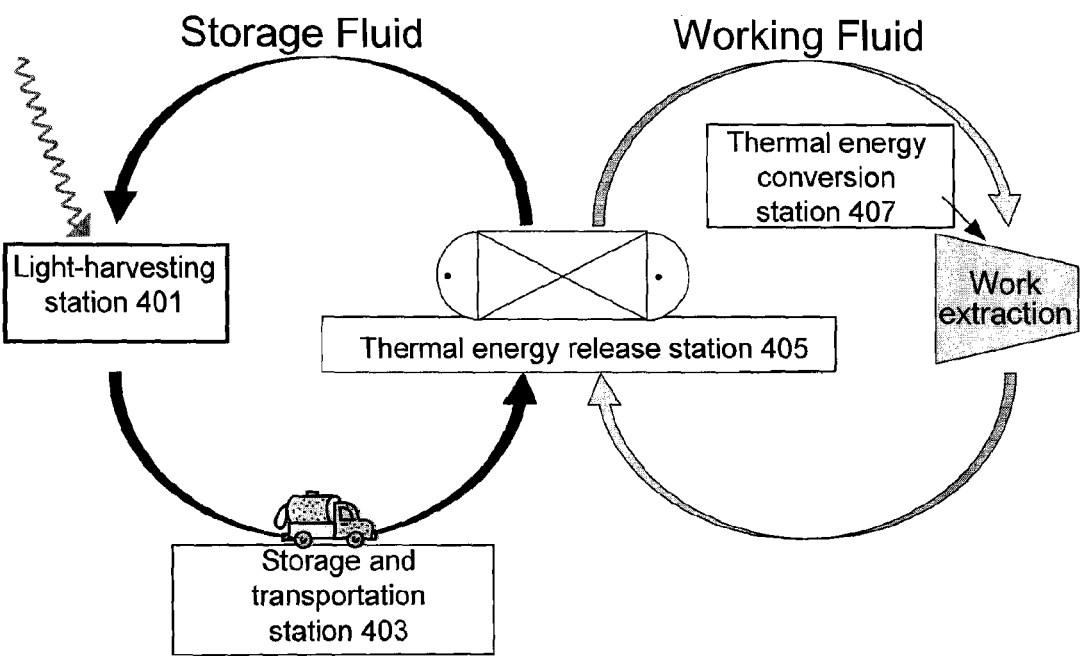
FIG. 4 is a schematic presentation of a solar energy storage, conversion, and transportation system, in accordance with some of the embodiments described herein.

FIG. 4 illustrates cycles for storing and transforming solar energy in accordance with one embodiment. The storage fluid cycle illustrates cycling of a solution containing an organometallic compound. In this example, the solution of organometallic compound is irradiated with sunlight at the light-harvesting station 401, is then stored at a storage station 403 and is transported to the thermal energy release station 405. Upon catalytic reaction and release of heat, the fluid is transferred back to the light-harvesting station 401, and the process is repeated. The working fluid cycle illustrates cycling of the heat exchange fluid. Cool fluid is introduced into the heat exchanger at the thermal energy release station 405 and is heated in this station by the heat released during the exothermic catalytic conversion of the higher-energy organometallic compound. The hot fluid is then directed to a thermal energy conversion station 407, where the working fluid generates mechanical work (which may be then used to generate electricity). The fluid is cooled at this station and is directed back to the heat exchanger in the thermal energy release station 405. Optionally, the working fluid may be cooled in a condenser after it exits the thermal energy conversion station and before it re-enters the thermal energy release station.

It is understood that the cycles shown in FIG. 4 are schematic and that they illustrate only one possible implementation of solar energy storage and conversion cycle. Thus, in this implementation one solvent is used in the storage fluid cycle (e.g., toluene), and one fluid is used in the working fluid cycle (e.g., water or steam). In other implementations, it may be advantageous to use different solvents for the photochemical reaction and for the catalytic conversion. In some embodiments, it may be advantageous to store the high-energy compound as a solid. In some embodiments the heat exchange fluid used at station 405 and the working fluid used at station 407 are different fluids.

Depending on a particular application, the cycles may be implemented in a continuous flow system or in a batch system. As it was mentioned, in some embodiments, the system may be used primarily as an energy conversion system without appreciable storage time. In this embodiment, a continuous flow cycle may be used, e.g., for generation of heat from sunlight in cold climates. In a batch system, discrete batches of organometallic compound are photoconverted to higher-energy isomer, are stored as batches and are used as needed.

In some embodiments, the entire system including a light-harvesting station, a storage station, and a thermal-energy release station is configured for operation in a continuous regime. In this regime, solution of an organometallic compound is allowed to flow continuously through the stations and between the stations, e.g., through the pipelines. For example, in one embodiment, a storage and transportation pipeline connects the light-harvesting station with the thermal energy release station. This pipeline is configured for providing the higher-energy compound from the light-harvesting station to the thermal energy release station. In some embodiments, a long-term storage station may be connected to this pipeline to enable long-term storage of the higher-energy compound. A reverse pipeline (e.g., a separate pipeline) connecting the thermal energy release station with the light-harvesting station is adapted for transporting the lower-energy compound obtained upon catalytic conversion back to the light-harvesting station to complete the cycle. The system may be adapted to operate entirely in a continuous mode, or, in other implementation only one or two of the stations are configured for operation in a continuous mode, while the remaining stations of the system may operate in a batch mode. Further, in some embodiments, it is preferable to continuously circulate the working fluid. In other embodiments, the working fluid may be discarded after it served its function.

Liquid Catalysts for Conversion of Higher Energy Isomer to a Lower Energy Isomer In some embodiments, the conversion of higher energy isomer to a lower energy isomer in an energy release station is performed with the use of a liquid catalyst or with the use of a solution containing a catalyst. For example, in one embodiment, the higher energy isomer (solid or in solution) is contacted with a solution containing a metal salt (e.g., $AgNO_3$, HgCl, or $Cu(OTf)_2$), a Lewis acid (e.g., $ZnBr_2$, $ZnCl_2$, or $BBr_3$), a Lewis base (e.g., imidazole, $PPh_3$, $AsPh_3$ or $P(OPh)_3$), or a weak ligand, e.g., water. In some embodiments it is provided that the weak ligand is not acetonitrile or CO, although both catalyze the conversion reaction. In some embodiments water (either neat or in a mixture with an organic solvent) is a preferred catalyst due to its low cost. The term "catalyst" does not mean that catalytic amounts need to be necessarily used, but rather indicates that catalytic rather than stoichiometric amounts are sufficient for the reaction to proceed.

In one embodiment, the higher energy isomer (as a solid or in solution) is contacted with a solution of the catalyst or with neat liquid catalyst, wherein the system is configured such that the phases containing the higher energy isomer and the catalyst are substantially immiscible. This is desired for more facile separation of the catalyst upon completion of the reaction. In one example the higher-energy isomer is dissolved in an organic solvent that is immiscible with water (e.g., hexane), and the solution is brought into contact with water, and both phases are vigorously mixed or shaken in order to maximize the surface area of contact. After the reaction is completed, and the released energy is collected, the organic phase containing the lower-energy isomer is separated from the aqueous phase, and the lower-energy isomer is directed from the energy release station to the light harvesting station.

In another embodiment the higher energy isomer and the catalyst are in contact in a homogeneous solution (e.g., THF/water solution). After the reaction is completed, and the released energy is collected, the catalyst and the lower energy isomer are separated by known techniques, such as drying, crystallization, evaporation, etc. After separation, the lower energy isomer is directed to the light harvesting station to complete the cycle.

Non-Catalytic Reactions in the Solar Energy Conversion Cycle

In some embodiments conversion of higher energy isomer to lower energy isomer is accomplished in one or more steps using non-catalytic reagents. For example in one embodiment the higher energy isomer is contacted with a reagent which converts the higher energy isomer to a lower energy isomer with the release of heat, however catalytic amounts of the reagent are not sufficient for the reaction to proceed. Some oxidants (e.g., ferrocenium salts) behave in this fashion. In this case stoichiometric amount of the reagent is needed for the reaction to proceed. As with the catalytic system, the reagent may be solid or may be in the liquid phase as it contacts the higher energy isomer.

In some embodiments conversion of higher energy isomer to a lower energy isomer is accomplished in two or more steps. For example, the higher energy isomer may first react with a stoichiometric amount of ligand (e.g. iodide) to form a ligand-substituted compound (e.g., iodo-substituted compound). In some embodiments, energy is released and collected at this stage. Next, the ligand-substituted compound can be converted to the lower energy isomer and the lower energy isomer is transferred to a light harvesting station as described above. In this case, one or more additional stations, dedicated to lower-energy isomer generation may be added.

An exemplary cycle in accordance with this embodiment is depicted below:

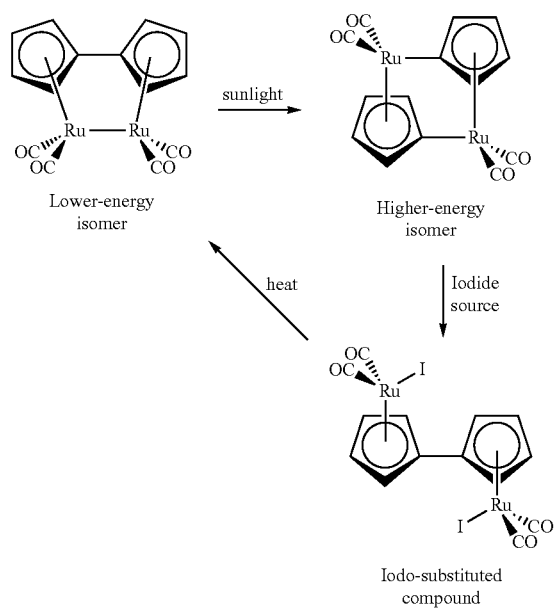

In this cycle the lower energy isomer is converted to a higher energy isomer in a light-harvesting station. In the thermal energy release station the higher energy isomer is contacted with an iodide source and is converted to an iodo-substituted compound. A variety of iodide sources, including iodide salts (e.g., KI), hydroiodic acid, and, in some embodiments, iodine, are used. In one embodiment, a coconut charcoal obtained from Fisher Scientific was found to contain enough iodide source, to allow for the formation of an iodo-substituted compound. In general iodide source can be either in solid or in liquid phase. In one specific embodiment a solution of higher energy isomer is contacted with solid coconut charcoal containing an iodide source. Next, the iodo-substituted compound is converted to a lower energy isomer. This can be accomplished, for example, by heating the iodo-substituted compound e.g., at 80° C. This conversion is typically accomplished at a separate station (lower energy isomer regeneration station) which may be spacially removed from the thermal energy release station. After the lower energy isomer has been regenerated it can be transferred to the light harvesting station, thus completing the cycle.

Photochemically Active Organometallic Assemblies

While systems and methods described herein can be used with any organometallic assemblies that fulfill the energetic requirements described with reference to FIG. 1, in some embodiments, the photochemically active lower-energy organometallic compound is a bis(annulenyl) dimetal complex. "Bis(annulenyl) dimetal complex" as used herein refers to compound 7.

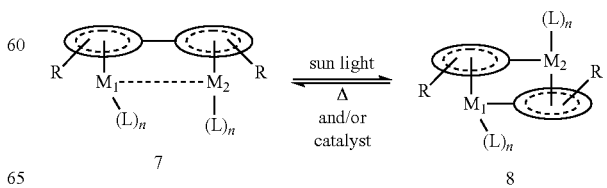

Compound 7 contains two metals, M1 and M2, which, in some embodiments, are connected by a metal-metal bond. In other embodiments metal-metal bond is absent. The metals, M1 and M2, need not be the same, and they include metals which are capable of forming organometallic complexes, for example, transition metals, lanthanide metals, etc. For example, compound 7 may be a hetero- or homobimetallic complex in which M1 and M2 are independently selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Ta, Sn, Sb, Pb, Bi, as well as from lanthanides such as Ce, Pr, Nd, Pm, Sm, Eu, Gd, Tb, Dy, Ho, Er, Tm, Yb, Lu. Specifically, homobimetallic di-Fe, di-Ru, and di-Os complexes, as well as heterobimetallic, e.g., Fe—Ru, Ru—Os, Fe—Co, Fe—Mo, Ru—Mo complexes are provided, in some embodiments.

The metals, M1 and M2 in compound 7 coordinate to a bisannulenyl ligand on one side and to one or more ligands L on the other side. The number of ligands L, n, can range from 1 to 4 depending on the electronic properties of ligand L, its denticity, the electronic configuration of a particular complex, etc. In some embodiments, L is a carbon-containing, oxygen-containing, a nitrogen-containing, a phosphorus-containing, a halide-containing, or a sulfur-containing ligand, wherein C, O, N, S, P, or halide (e.g., F, Cl. Br, I) are involved in binding to the metal. Example ligands include without limitation CO, NO, $P(OCH_3)_3$, $P(CH_3)_3$. Ligands L need not necessarily be the same and complexes with mixed ligands, e.g., with $P(OCH_3)_3$ and CO ligands are provided in some embodiments. In some embodiments, relatively π-acidic ligands, such as CO and phosphites (e.g., $P(OCH_3)_3$), are used. Unidentate ligands are used in some embodiments, while multidentate ligands can be also employed in other embodiments.

The bis-annulenyl ligand contains two rings connected by a bond, typically a carbon-carbon bond. Each ring may be 4-8 membered, and, in addition to carbon, may contain one or more heteroatoms, such as N, O, P, and S. The rings of bisannulenyl ligand are identical in some embodiments but need not necessarily be identical in all embodiments. Thus, for example, rings of different size or rings having different heteroatom substitution pattern may form the bisannulenyl ligand.

Each ring of the bisannulenyl ligand can be optionally substituted with independently selected substituents R. Substituents R are independently selected from the group consisting of H, halide (F, Cl, Br, or I), $NO_2$, $CF_3$, $C_{1-10}$ alkyl, $C_{2-10}$ alkenyl, $C_{2-10}$ alkynyl, $C_{2-6}$ heterocyclyl, $C_{6-12}$ aryl, $C_{7-14}$ alkaryl, $C_{3-10}$ alkheterocyclyl, and $C_{1-10}$ heteroalkyl. Preferably, substituent R does not include coordinating groups which are capable of catalyzing the conversion of higher-energy isomer to the lower energy isomer. Thus, in some embodiments R does not include sterically unencumbered coordinating groups, such as sterically unencumbered amino, nitrilo, thio, thioether, alkynyl, and alkenyl groups. In some embodiments, R is independently selected from the group consisting of H, halide (F, Cl, Br, or I), $NO_2$, $CF_3$, $C_{1-10}$ alkyl, $C_{6-12}$ aryl, $C_{7-14}$ alkaryl.

As used herein, the terms "alkyl" and the prefix "alk-" are inclusive of both straight chain and branched chain groups and of cyclic groups, i.e., cycloalkyl. Cyclic groups can be monocyclic or polycyclic and preferably have from 3 to 6 ring carbon atoms, inclusive. Exemplary cyclic groups include cyclopropyl, cyclobutyl, cyclopentyl, and cyclohexyl groups. The $C_{1-10}$ alkyl group may be substituted or unsubstituted. Exemplary substituents include halide, fluoroalkyl, perfluoralkyl, quaternary amino, carboxyalkyl, and carboxyl groups. $C_{1-10}$ alkyls include, without limitation, methyl; ethyl; propyl; isopropyl; cyclopropyl; cyclopropylmethyl; cyclopropylethyl; butyl; iso-butyl; sec-butyl; tert-butyl; cyclobutyl; cyclobutylmethyl; cyclobutylethyl; pentyl; cyclopentyl; cyclopentylmethyl; cyclopentylethyl; 1-methylbutyl; 2-methylbutyl; 3-methylbutyl; 2,2-dimethylpropyl; 1-ethylpropyl; 1,1-dimethylpropyl; 1,2-dimethylpropyl; 1-methylpentyl; 2-methylpentyl; 3-methylpentyl; 4-methylpentyl; 1,1-dimethylbutyl; 1,2-dimethylbutyl; 1,3-dimethylbutyl; 2,2-dimethylbutyl; 2,3-dimethylbutyl; 3,3-dimethylbutyl; 1-ethylbutyl; 2-ethylbutyl; 1,1,2-trimethylpropyl; 1,2,2-timethylpropyl; 1-ethyl-1-methylpropyl; 1-ethyl-2-methylpropyl; and cyclohexyl.

By "$C_{2-10}$ alkenyl" is meant a branched or unbranched hydrocarbon group containing one or more double bonds and having from 2 to 10 carbon atoms. The $C_{2-10}$ alkenyl group may be substituted or unsubstituted. Examples include, without limitation, vinyl; allyl; 2-cyclopropyl-1-ethenyl, and 2,2-dimethyl-3-butenyl.

By "$C_{2-10}$ alkynyl" is meant a branched or unbranched hydrocarbon group containing one or more triple bonds and having from 2 to 10 carbon atoms. The $C_{2-10}$ alkynyl group may be substituted or unsubstituted. Examples include, without limitation, ethynyl and 1-propynyl.

By "$C_{2-6}$ heterocyclyl" is meant a stable 5- to 7-membered monocyclic or 7- to 14-membered bicyclic heterocyclic ring which is saturated, partially unsaturated or unsaturated (aromatic), and which consists of 2 to 6 carbon atoms and 1, 2, 3, or 4 heteroatoms independently selected from the group consisting of N, O, and S and including any bicyclic group in which any of the above-defined heterocyclic rings is fused to a benzene ring. The heterocyclyl group may be substituted or unsubstituted. The nitrogen and sulfur heteroatoms may optionally be oxidized. Examples include, without limitation, benzofuranyl, and furanyl.

By "$C_{6-12}$ aryl" is meant an aromatic group having a ring system comprised of carbon atoms with conjugated electrons (e.g., phenyl). The aryl group has from 6 to 12 carbon atoms. The aryl group may be substituted or unsubstituted.

By "$C_{7-12}$ alkaryl" is meant an alkyl substituted by an aryl group (e.g., benzyl) having from 7 to 14 carbon atoms.

By "$C_{3-10}$ alkheterocyclyl" is meant an alkyl substituted heterocyclic group having from 3 to 10 carbon atoms in addition to one or more heteroatoms (e.g., 3-furanylmethyl, 2-furanylmethyl, 3-tetrahydrofuranylmethyl, or 2-tetrahydrofuranylmethyl).

By "$C_{1-10}$ heteroalkyl" is meant a branched or unbranched alkyl, alkenyl, or alkynyl group having from 1 to 10 carbon atoms in addition to one or more heteroatoms, wherein one or more methylenes (CH2) or methines (CH) are replaced by nitrogen, oxygen, sulfur, or carbonyl. Examples include, without limitation, ethers, amides, and carbamates.

Compound 7 converts to complex 8 upon exposure to sunlight, which, in turn, is capable of being converted back to 7 upon exposure to a catalyst and/or upon heating.

A specific example of bisannulenyl dimetal system 7 is a fulvalenyl complex 9, which is capable of being photochemically converted to a higher-energy isomer 10, which, in turn, can be isomerized to a lower-energy compound 9 by a thermal or catalytic exothermic process.

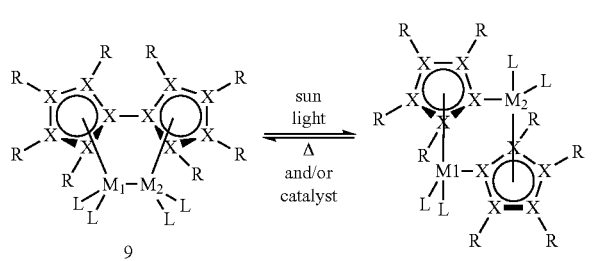

9
10

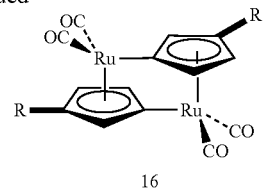

16 wherein R = t-Butyl

The "fulvalenyl dimetal" complex, as used herein, corresponds to complex 9. The complex has a bisannulenyl ligand ("fulvalenyl" ligand) which is composed of two five-membered rings. X is independently selected from C, N, O, P, and S. In one embodiment, all of X is carbon. The complex contains two unidentate ligands, L, coordinated to each of the metals. M1, M2, R, and L are as described above for the bisannulenyl analog.

In specific embodiments, the complex is a homobimetallic di-Fe, di-Ru, or a di-Os complex, in which all of X are carbon atoms, R groups are same or different and are independently selected from the group consisting of H, and $C_{1-10}$ alkyl. L are the same or different and are independently selected from the group consisting of π-acidic ligands, such as CO and phosphite (e.g., $P(OCH_3)_3$.)

Specific examples include fulvalenyl di-Ru compounds, 5, 11, 13, 15, and 17, which are capable of photochemical conversion to higher-energy compounds 6, 12, 14, 16, and 18, respectively, upon exposure to sun light, as well as of the exothermic reversal to the corresponding lower-energy isomers.

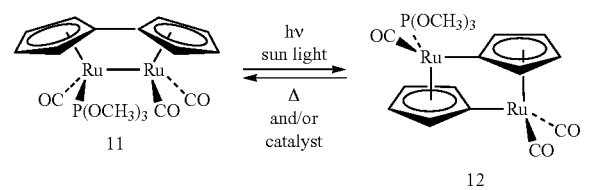

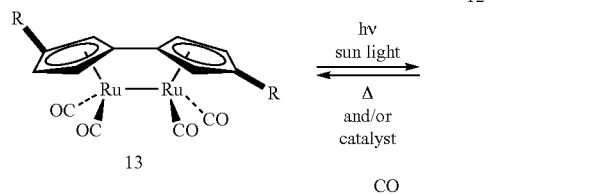

wherein R = t-Butyl

The described organometallic assemblies and their analogs can be prepared according to methods described in an article by Vollhardt et al. published in the Journal of the American Chemical Society, 1983, 105, pp. 1676-1677, in an article by Boese et al. published in the Journal of the American Chemical Society, 1997, 119, pp. 6757-6773, and in an article by Zhu et al. published in Synthesis, 2005, 19, pp. 3373-3379. All three articles are herein incorporated by reference in their entireties and for all purposes. It is understood that one of skill in the art can modify the methods described in these articles to synthesize other bisannulenyl dimetal complexes beyond those described in the articles.

Alternative Embodiments

As it was mentioned above, a number of alternative embodiments beyond the embodiment which involves solid-state catalytic conversion of higher-energy isomer may be implemented. For example, in one alternative embodiment a liquid-phase catalyst is used. The liquid phase catalyst can be, for example, a coordinating liquid, such as a liquid comprising one or more coordinating moieties selected from the group consisting of —CN, —NH$_2$, —NHR, —NR$_2$, —OH, —OR, —SH, —SR, and —C≡NR coordinating groups, wherein R is an alkyl. In one embodiment, acetonitrile may be used as a catalyst for conversion. In another embodiment, water is used. In yet other embodiments solutions containing electrophilic metal salts, Lewis acids or Lewis bases maybe used. In some embodiments, liquids containing compound having one or more heterocyclic coordinating moieties, such as substituted or unsubstituted pyridyl, imidazolyl, and pyrazolyl groups, may be used. For example, substituted or unsubstituted pyridine may be employed. When a liquid-phase catalyst is used, the thermal energy release station is adapted for liquid catalyst admission and separation. Thus, the liquid catalyst is introduced through a catalyst admission port into the catalytic conversion chamber. In some embodiments, the liquid catalyst and the solution of the higher-energy organometallic compound are mixed and agitated. The released heat is captured as described above and is transformed to mechanical work or electricity if desired. Then, the resulting low-energy organometallic compound is separated from the liquid catalyst, e.g., by evaporation of the liquid catalyst, recrystallization, or extraction, and the low-energy organometallic compound is transported to the light-harvesting station.

In another alternative embodiment a thermal conversion of high-energy organometallic compound to a lower energy organometallic compound is performed. The systems suitable for such conversion are systems in which $\Delta H storage >> \Delta H^{\neq} rev$. In these systems it may be economically feasible to heat trigger the system to start the reaction, and then receive large energetic payback upon conversion. In such a system no catalyst is used. The thermal energy release station in this case is equipped with a flash heater or heat spark which provides sufficient energy for the thermal conversion reaction to start. The reaction will then spontaneously proceed as more heat is generated. It is noted that even in catalytic systems a heater may be installed, if moderate heating is needed to start the reaction.

In yet another alternative embodiment the cycle may be coupled with chemical reactions, and may be expanded beyond mere isomerization, as was previously described making reference to an iodo-substituted compound and the corresponding cycle. As it was described, in some embodiments, instead of catalytic conversion, a stoichiometric ligand exchange will convert the higher-energy compound to a lower-energy isomer with release of heat. For example, CO ligand may be exchanged for a different coordinating moiety (e.g., an amine, a nitrile, a phosphine, a halide etc.). The technical implementation of this step involves adding the substituting ligand in a variety of ways (e.g., as a solid, supported on a solid, as a neat liquid or in solution) to the solution of high-energy organometallic compound at the heat energy release station. The ligand is added not in a catalytic amount, but stoichiometrically or in excess. After substitution takes place and the thermal energy is released, the substitution product may be discarded, or, to complete the cycle, may undergo another ligand substitution, or ligand elimination, which will bring it back to the low-energy photochemically active starting material.

EXPERIMENTAL

A number of compounds were screened for their ability to catalyze conversion of 6 (higher energy isomer) to 5 (lower energy isomer). In these experiments 5.0 mg of 6 was dissolved in 1.0 mL of tetrahydrofuran (THF) resulting in 11 mM solution of 6. Next, approximately five equivalents of each catalytic species were added and the reaction was allowed to proceed at room temperature (about 20-25° C.). While it is understood that five equivalents is not standard when describing a catalytic amount, this was a practical amount for an initial screen. Further, it was subsequently determined that the catalysts were not consumed in the reaction. The reactions were monitored by thin-layer chromatography, and were analyzed by $^1$H NMR spectroscopy to determine the amount of 6, 5, and any other byproducts. Table 1 provides a summary of obtained results.

TABLE 1

Results of reagent screening for conversion of 6 to 5.

| Reagent | Time | Result |
|---|---|---|
| Use of a Lewis Acid or Base | | |
| $AgNO_3$ | 24 h | Complete conversion to 5 |
| HgCl | 24 h | 25% conversion to 5, no other byproducts |
| $Cu(OTf)_2$ | 24 h | 70% conversion to 5, no other byproducts |
| $CuCl_2$ | 24 h | 20% dichloride, remainder photoisomer (6) |
| $SnCl_2$ | 6 h | Stoichiometric formation of dichloride (monitored under catalytic conditions) by adding portions at a time. 50% conversion in 6 hours |
| $ZnBr_2$ | 24 h | 50% conversion to 5, 50% conversion to the dibromide |
| $ZnCl_2$ | 24 h | 50% conversion to 5, remainder is photoisomer |
| $BBr_3$ | 24 h | 50% conversion to 5, 50% formation of other byproducts |
| Imidazole | 24 h | 100% conversion to 5 |
| $PPh_3$ | 24 h | 95% conversion to 5, remainder photoisomer |
| $AsPh_3$ | 24 h | 95% conversion to 5, remainder photoisomer |
| $P(OPh)_3$ | 24 h | 50% conversion to 5, and 50% to another product |
| $AgBF_4$ | 30 min | Immediate reaction with the formation of precipitate and various products. |
| $Ag(O_2CCF_3)$ | 30 min | Immediate reaction (color change) with 50% of 6 remaining and 50% as various products |
| $Pd(OH)_2$ on Carbon | 24 h | No reaction |
| $MnO_2$ | 24 h | No reaction |
| $SeO_2$ | 24 h | No reaction |
| $Ag_2O$ | 24 h | No reaction |
| Polyacrylonitrile | 10 min | No reaction |
| Use of Water and Methanol | | |
| 4:1 THF:$H_2O$ | 2 h | 90% conversion of 6 to 5. |
| 4:1 THF:$CH_3OH$ | 3 h | No reaction at room temperature |
| Use of an oxidant or reductant | | |
| Ferrocenium$^+$ $PF_6^-$ | 3 h | 14% of 6 converted to 5 in stoichiometric fashion (conversion is the same percent as catalyst/oxidant used). |
| Na/Hg | 12 h | No conversion to 5. |

As it can be seen from Table 1 several electrophilic metal salts ($AgNO_3$, HgCl, $Cu(OTf)_2$) were competent for the conversion of 6 to 5 at room temperature. A number of Lewis acids ($ZnCl_2$, $BBr_3$, $ZnBr_2$, and $SnCl_2$) all showed reaction with 6, with all reacting to form 5 in at least 50% yield. $SnCl_2$, however, exclusively formed the dichloride. The presence of halides in the catalyst generally resulted in the formation of dihalide products thus suggesting that the catalyst for the conversion of 6 to 5 in some embodiments should not contain halides. It is also noted that while silver nitrate was effective in the desired conversion of 6 to 5, other silver salts such as silver trifluoroacetate and silver tetrafluoroborate resulted in immediate reactions with the production of various byproducts.

Along with the use of Lewis acids as potential catalysts, a number of Lewis bases were also screened. $PPh_3$, $AsPh_3$, imidazole, $P(OPh)_3$ were all effective at converting 6 to 5 at room temperature albeit still at slower than desirable rates (~24 hours). These reagents are particularly advantageous because they do not irreversibly bind to the ruthenium complex with the exception of $P(OPh)_3$ which formed a byproduct in 50% yield.

Further, it was serendipitously discovered that water catalyzes the conversion of 6 to 5 at good rates (100% conversion in 2 hours) in a 4:1 THF/water solution. Interestingly, methanol did not show conversion of 2 to 1 at room temperature (no conversion in 3 hours). Attempts were made to test whether the conversion was a result of acid or base catalysis. The addition of trifluoromethanesulfonic acid showed no acceleration in the rate of conversion. Addition of base resulted in decomposition of the complex.

Further an oxidant ($FcPF_6$) and a reducing agent (Na/Hg) were tested as possible catalyst. In the case of ferrocenium salt, it was determined that conversion to 5 proceeds but requires stoichiometeric amounts of ferrocenium salts. Treatment with sodium amalgam did not provide any appreciable conversion.

Various details have been omitted for clarity's sake, and various design alternatives may be implemented. Therefore, the present examples are to be considered as illustrative and not restrictive, and the invention is not to be limited to the details given herein, but may be modified within the scope of the appended claims.

What is claimed is:

1. A system for converting light energy to thermal, mechanical or electrical energy, the system comprising:
   (a) a light-harvesting station containing a photochemically active organometallic compound, wherein the photochemically active organometallic compound is converted to a higher-energy organometallic compound upon exposure to light, wherein the photochemically active organometallic compound is a fulvalenyl diruthenium compound selected from the group consisting of the following compounds:

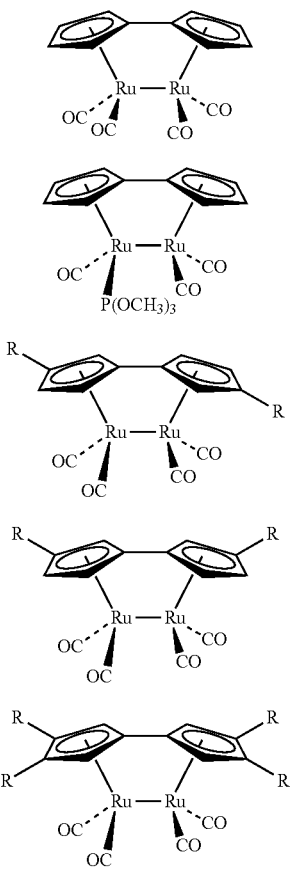

wherein R = t-Butyl (b) a storage station containing the higher-energy organometallic compound, wherein the higher-energy organometallic compound does not spontaneously convert to lower-energy compounds, but is capable of being converted to the lower-energy photochemically active organometallic compound upon exposure to a solid-state catalyst; and
   (c) a thermal energy release station containing the solid-state catalyst capable of catalyzing the catalytic conversion of the higher-energy organometallic compound to the lower-energy photochemically active organometallic compound at ambient temperatures without the need to heat the higher-energy organometallic compound, wherein the conversion of the higher-energy organometallic compound to the photochemically active organometallic compound releases at least about 15 kcal/mol of thermal energy.

2. The system of claim 1, wherein the system converts solar energy to thermal energy.

3. The system of claim 2 further comprising a station for converting thermal energy to electrical energy.

4. The system of claim 1, wherein the conversion of the higher-energy organometallic compound to the photochemically active organometallic compound releases at least about 30 kcal/mol of thermal energy.

5. The system of claim 1, wherein the lower-energy photochemically active organometallic compound and the higher-energy organometallic compound are capable of being interconverted without substantial degradation for at least 10 cycles.

6. The system of claim 1, wherein the light-harvesting station comprises a container housing the photochemically active organometallic compound during its conversion to the higher-energy organometallic compound, wherein the container is configured for exposing the photochemically active organometallic compound to sunlight.

7. The system of claim 6, wherein the container is adapted for exposing a continuously flowing liquid to sunlight.

8. The system of claim 1, wherein the storage station comprises a storage container configured for storing the higher-energy organometallic compound.

9. The system of claim 8, wherein the storage container is transportable.

10. The system of claim 8, wherein the storage container comprises a pipeline adapted for transporting a continuously flowing liquid from the light-harvesting station to the thermal energy release station.

11. The system of claim 1, wherein the thermal energy release station comprises a heat exchange fluid for transferring the thermal energy generated by the catalytic conversion to serve a desired purpose.

12. The system of claim 1, wherein the thermal energy release station comprises a thermoelectric material for direct conversion of heat to electrical energy.

13. The system of claim 1, wherein the thermal energy release station comprises a heat exchanger, said heat exchanger housing the solid state catalyst such that the solid state catalyst can efficiently contact the photo chemically active organometallic compound, and accomplish the catalytic conversion to the lower-energy compound.

14. The system of claim 1, wherein the catalytic conversion is capable of occurring at a temperature of less than about 60° C.

15. The system of claim 1, wherein the solid-state catalyst is selected from the group consisting of charcoal, alumina, and a solid comprising coordinating groups.

16. The system of claim 1, wherein the solid-state catalyst is charcoal.

17. The system of claim 1, wherein the system is configured for providing the higher-energy organometallic compound to the thermal energy release station in solution.

18. The system of claim 17, wherein the system is configured for continuously flowing a solution of the higher-energy organometallic compound through the thermal energy release station.

19. The system of claim 18, wherein the solid-state catalyst is packed or fixedly supported in the thermal energy release station such that the flow of the solution of the higher-energy organometallic compound does not remove the catalyst from the thermal energy release station.

20. The system of claim 1, wherein the system is configured for providing the higher-energy organometallic compound to the thermal energy release station in solid state.

21. The system of claim 1 further comprising a pipeline adapted for returning a solution from the thermal energy release station to the light-harvesting station.

* * * * *